US008510139B2

(12) United States Patent
DeSorbo

(10) Patent No.: US 8,510,139 B2
(45) Date of Patent: Aug. 13, 2013

(54) PRODUCT SUSTAINABILITY INDICATOR

(75) Inventor: Louis DeSorbo, Niskayuna, NY (US)

(73) Assignee: The Wercs, Ltd., Latham, NY (US)

( * ) Notice: Subject to any disclaimer, the term of this patent is extended or adjusted under 35 U.S.C. 154(b) by 1137 days.

(21) Appl. No.: 12/424,713

(22) Filed: Apr. 16, 2009

(65) Prior Publication Data

US 2010/0262445 A1 Oct. 14, 2010

Related U.S. Application Data

(60) Provisional application No. 61/168,495, filed on Apr. 10, 2009.

(51) Int. Cl.
*G06Q 40/00* (2012.01)
(52) U.S. Cl.
USPC .............................................. 705/7
(58) Field of Classification Search
USPC .............................................. 705/7
See application file for complete search history.

(56) References Cited

U.S. PATENT DOCUMENTS

| | | | |
|---|---|---|---|
| 5,652,708 A | 7/1997 | Miyamoto et al. | |
| 5,852,560 A | 12/1998 | Takeyama et al. | |
| 7,096,084 B2 | 8/2006 | Long et al. | |
| 7,136,794 B1 | 11/2006 | Bechhoefer | |
| 2004/0162710 A1 | 8/2004 | Schwartz | |
| 2010/0042453 A1* | 2/2010 | Scaramellino et al. | 705/7 |

FOREIGN PATENT DOCUMENTS

| | | |
|---|---|---|
| EP | 1197895 A2 | 4/2002 |
| WO | 9811493 A1 | 3/1998 |

OTHER PUBLICATIONS

O'Lenick, Andrew, "Silicone Spectator, Supplemental Edition", Aug. 15, 2008, 13 pages.

\* cited by examiner

*Primary Examiner* — Shay Glass

(74) *Attorney, Agent, or Firm* — Hoffman Warnick LLC

(57) ABSTRACT

The system and method of this disclosure calculates an indicator of a product's sustainability (i.e., green-ness) based on an algorithm that considers membership of a component(s) of the product in regulatory lists (grouped by regulatory category), the percentage of the component in the product and weighting factors for the regulatory categories. The algorithm can run the calculation for every component of the product, and for every regulatory category to determine a sustainability indicator for a classification, such as a health related classification, environmental related classification, physical hazard classification, etc.

27 Claims, 15 Drawing Sheets

Category Definition

Known Carcinogens

Remove Selected Link(s)    Add a Link

| Remove? | List Name |
|---|---|
| ☐ | U.S - Illinois - Toxic Air Contaminant Carcinogens |
| ☐ | IARC - Group 1 (Carcinogenic to Humans) |
| ☐ | EU - REACH (1907/2006) - Carcinogens Category 2 |
| ☐ | EU - REACH (1907/2006) - Carcinogens Category 1 |
| ☐ | NTP (National Toxicology Program) - Report on Carcinogens - Known Human Carcinogens |
| ☐ | U.S. - California - Proposition 65 - Carcinogens List |

Back to View

FIG. 3A

Category Definition

Reproductive Hazards

Remove Selected Link(s)    Add a Link

| Remove? | List Name |
|---|---|
| ☐ | EU - Dangerous Substances Directive (67/548/EEC) - Annex I - Reproductive Category 2 |
| ☐ | EU - Dangerous Substances Directive (67/548/EEC) - Annex I - Reproductive Category 1 |
| ☐ | EU - REACH (1907/2006) - Toxic to Reproduction Category 2 |
| ☐ | EU - REACH (1907/2006) - Toxic to Reproduction Category 1 |
| ☐ | U.S. - California - Proposition 65 - Reproductive Toxicity - Male |
| ☐ | U.S. - California - Proposition 65 - Reproductive Toxicity - Female |

Back to View

FIG. 3B

| Views | Categories | Groups | User Management | Back to Search |

Category Definition

Target Grey List

Remove Selected Link(s)    Add a Link

| Remove? | List Name |
| --- | --- |
| ☐ | WAL-MART Planned phase-out chemicals |

Back to View

FIG. 3C

| Views | Categories | Groups | User Management | Back to Search |

Category Definition

Endocrine Disruptors

Remove Selected Link(s)    Add a Link

| Remove? | List Name |
| --- | --- |
| ☐ | EU - Endocrine Disrupters (COM (2001)262) - List of Evaluated Substances and their Exposure Concern |
| ☐ | Denmark - List of Substances with Documented Endocrine Disruption Effects |
| ☐ | EU - Endocrine Disrupters - Ranked Priority List - Human Health Categorizations |

Back to View

FIG. 3D

Category Definition

Suspected Carcinogens

| Remove? | List Name |
|---|---|
| ☐ | IARC - Group 2A (Probably Carcinogenic to Humans) |
| ☐ | IARC - Group 2B (Possibly Carcinogenic to Humans) |
| ☐ | NTP (National Toxicology Program) - Report on Carcinogens - Reasonably Anticipated to be Human Carcinogens |

Back to View

FIG. 3E

Category Definition

Mutagenic Hazards

| Remove? | List Name |
|---|---|
| ☐ | Japan - ISHL Mutagens - Existing Chemicals |
| ☐ | Japan - ISHL Mutagens - New Chemicals |
| ☐ | EU - Dangerous Substances Directive (67/548/EEC) - Annex I - Mutagens Category 2 |
| ☐ | EU - Dangerous Substances Directive (67/548/EEC) - Annex I - Mutagens Category 1 |
| ☐ | EU - REACH (1907/2006) - Mutagens Category 2 |
| ☐ | U.S. - California - Proposition 65 - Developmental Toxicity |

Back to View

FIG. 3F

Category Definition

Sensitizer

| Remove? | List Name |
|---|---|
| ☐ | Japan - GHS - Skin Sensitizers |
| ☐ | Japan - GHS - Respiratory Sensitizers |
| ☐ | ACGIH - Threshold Limit Values - Sensitization (SEN) Notations |

Back to View

FIG. 3G

Category Definition

Ozone Depletion

| Remove? | List Name |
|---|---|
| ☐ | EU - Ozone Depleting Substances Regulation (2037/2000/EC) |
| ☐ | U.S. - California - Ozone Depleting Compounds Prohibited in Antiperspirants and Deodorants |
| ☐ | U.S. - CAA (Clean Air Act) - Class I Ozone Depletors |
| ☐ | U.S. - CAA (Clean Air Act) - Class II Ozone Depletors |

Back to View

FIG. 3H

| Views | Categories | Groups | User Management | Back to Search |

Category Definition

Hazardous Waste

[Remove Selected Link(s)]   [Add a Link]

| Remove? | List Name |
|---|---|
| ☐ | U.S. - Washington - Dangerous Waste - Dangerous Waste Constituents List |
| ☐ | U.S. - California - 22 CCR - Special Hazardous Wastes |
| ☐ | U.S. - California - 22 CCR - Hazardous Waste Codes - Appendix XII |
| ☐ | U.S. - North Dakota - Hazardous Wastes - Discarded Chemical Products, Off-Specification Species, Container and Spill Residues |
| ☐ | U.S. - RCRA (Resource Conservation & Recovery Act) - U Series Wastes - Acutely Toxic Wastes & Other Hazardous Characteristics |
| ☐ | U.S. - RCRA (Resource Conservation & Recovery Act) - P Series Wastes - Acutely Toxic Wastes |
| ☐ | U.S. - RCRA (Resource Conservation & Recovery Act) - D Series Wastes - Max Conc of Contaminants for the Tox Characteristic |

[Back to View]

FIG. 3I

| Views | Categories | Groups | User Management | Back to Search |

Category Definition

VOC

[Remove Selected Link(s)]   [Add a Link]

| Remove? | List Name |
|---|---|
| ☐ | U.S. - Connecticut - Volatile Substances |
| ☐ | U.S. - Oklahoma - Specialty Coatings VOC Limits |
| ☐ | U.S. - California - Volatile Organic Compounds Exempt from Requirements |
| ☐ | U.S. - CAA (Clean Air Act) - Volatile Organic Compounds (VOCs) in SOCMI |

[Back to View]

FIG. 3J

Category Definition

PBT Chemicals

Remove Selected Link(s)    Add a Link

| Remove? | List Name |
|---|---|
| ☐ | U.S. - California - 22 CCR - Total Threshold Conc. (TTLC)-Persistent Bioaccumulative Substances - Extremely Hazardous Wastes |
| ☐ | U.S. - California- 22 CCR-Soluble Threshold Limit Conc. (STLC) Values-Persistent and Bioaccumulative Toxic Substances |
| ☐ | U.S. - CERCLA/SARA - Section 313 - PBT Chemical Listing |
| ☐ | U.S. - California - 22 CCR-Total Threshold Limit Conc. (TTLC) Values-Persistent and Bioaccumulative Toxic Substances |
| ☐ | U.S. - Washington - Persistent Bioaccumulative Toxins |
| ☐ | EU - Interim Strategy for Management of PBT and vPvB Substances (PBT Assessments) |
| ☐ | U.S. - EPA - Priority PBT List |
| ☐ | U.S. - CWA (Clean Water Act) - Bioaccumulative Chemicals of Concern (BCCs) |

Back to View

FIG. 3K

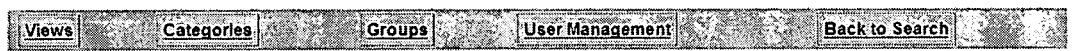

Category Definition

Air Pollutants

Remove Selected Link(s)    Add a Link

| Remove? | List Name |
|---|---|
| ☐ | U.S. - CAA (Clean Air Act) - 1990 Hazardous Air Pollutants |
| ☐ | U.S. - CAA (Clean Air Act) - HON Rule - Organic HAPs |
| ☐ | U.S. - CAA (Clean Air Act) - High Risk Hazardous Air Pollutants |

Back to View

FIG. 3L

Category Definition

Water Pollutants

| Remove? | List Name |
|---|---|
| ☐ | U.S. - CWA (Clean Water Act) - Hazardous Substances |
| ☐ | U.S. - CWA (Clean Water Act) - Priority Pollutants |
| ☐ | U.S - CWA (Clean Water Act) - Toxic Pollutants |
| ☐ | U.S. - DOT (Department of Transportation) - Marine Pollutants (regulated at 10% or greater) - (Appendix B) |
| ☐ | U.S. - DOT (Department of Transportation) - Severe Marine Pollutants (regulated at 1% or greater) - (Appendix B) |
| ☐ | IMDG - Severe Marine Pollutants |
| ☐ | IMDG - Marine Pollutants |
| ☐ | IMDG - Potential Marine Pollutants |

Back to View

FIG. 3M

Categories used in this View:

| Name | Group | Weight | Active | Details |
|---|---|---|---|---|
| Known Carcinogens | Health | 500 | ☑ | Details |
| Reproductive Hazards | Health | 50 | ☑ | Details |
| Target Grey List | Health | 2000 | ☑ | Details |
| Endocrine Disruptors | Health | 100 | ☑ | Details |
| Suspected Carcinogens | Health | 75 | ☑ | Details |
| Mutagenic Hazards | Health | 50 | ☑ | Details |
| Sensitizer | Health | 25 | ☑ | Details |
| Exposure | Health | 10 | ☑ | Details |
| Ozone Depletion | Environment | 75 | ☑ | Details |
| Hazardous Waste | Environment | 50 | ☑ | Details |
| VOC | Environment | 50 | ☑ | Details |
| PBT Chemicals | Environment | 100 | ☑ | Details |
| Air Pollutants | Environment | 25 | ☑ | Details |
| Water Pollutants | Environment | 25 | ☑ | Details |

[Save Mapping] [Edit Categories]

| Sustainability Goals | 2008 | 2009 | 2010 |
|---|---|---|---|
| Health | 1000 | 800 | 600 |
| Environment | 1000 | 800 | 700 |

[Save Goals]

FIG. 4

| dbo_T_Prod_Comp | | | |
|---|---|---|---|
| F_Product | F_Cas_Number | F_Chem_Name | F_Percent |
| 1001137 | 10-65-1 | Benzoquinone | 10 |
| 1001137 | 200-23-7 | Benzo(k l)xanthene | 10 |
| 1001137 | 300-01-6 | Butanedioic acid, oxo-, disodium salt | 10 |
| 1001137 | 400-04-4 | 1,2,4-Trichloro-5-fluorobenzene | 10 |
| 1001137 | 50-00-0 | Formaldehyde | 10 |
| 1001137 | 60-00-4 | Edta | 10 |
| 1001137 | 70-00-8 | Trifluridine | 10 |
| 1001137 | 80-00-2 | Benzene, 1-chloro-4-(phenylsulfonyl)- | 10 |
| 1001137 | 90-00-6 | o-Ethylphenol | 20 |

FIG. 6

PRODUCT SUSTAINABILITY INDICATOR

This application claims the benefit of co-pending U.S. Provisional Application No. 61/168,495, filed on Apr. 10, 2009, which is hereby incorporated herein by reference.

TECHNICAL FIELD

The disclosure relates generally to the field of assessing environmental impact, and more particularly, to a system, method and program product for determining an indicator of a product's sustainability.

BACKGROUND ART

As consumers become more environmentally aware, it is desirable to calculate a product's sustainability, or "green-ness." Currently, these calculations can be done by various algorithms, which typically calculate a product's effect on the environment (e.g., a carbon footprint). This can be calculated throughout the life-cycle of a product, e.g., manufacturing, shipping, consumption, etc. Current systems use various factors to calculate a product's impact on the environment, for example, energy used, gas used, miles driven, chemical emissions/waste during manufacture, etc. However, current systems for calculating a product's so-called "green-ness" do not take into consideration whether any component of the product is listed on any regulatory lists worldwide.

SUMMARY OF THE INVENTION

The solution of this disclosure calculates an indicator of a product's sustainability (i.e., green-ness) based on an algorithm that considers membership of a component(s) of the product in regulatory lists (grouped by regulatory category), the percentage of the component in the product and weighting factors for the regulatory categories. The algorithm can run the calculation for every component of the product, and for every regulatory category to determine a sustainability indicator for a classification, such as a health related classification, environmental related classification, physical hazard classification, etc. The total sustainability indicator for the product, or for the different classifications, can be outputted for use as a user desires, e.g., plotted on a graph, displayed on a product, stored in a database, etc.

A first aspect of the invention provides a computer system for calculating a total sustainability indicator for a classification for a product including one or more components, the system comprising: a customization module configured to allow a user to: define a plurality of regulatory categories, select at least one regulatory list to be a member of each regulatory category, assign a weighting factor to each regulatory category, and sort each regulatory category into a classification; and a calculating module configured to calculate the sustainability indicator for the classification, wherein the calculating module: performs a calculation of an interim sustainability indicator including: determining a percentage of a component in the product, determining whether the component in the product is a member of any regulatory list in a regulatory category in the classification, in response to the component being a member of any regulatory list in the regulatory category in the classification, multiplying the percentage of the component in the product and the weighting factor for the regulatory category in the classification, repeating the calculation of an interim sustainability indicator for each regulatory category in the classification, and combining the interim sustainability indicators for each regulatory category to determine a total sustainability indicator for the component for the classification; repeats the calculation of an interim sustainability indicator for each component in the product to determine a total sustainability indicator for each component for the classification; and combines the total sustainability indicators for each component to determine a total sustainability indicator for the classification for the product.

A second aspect of the invention provides a computer system for calculating a sustainability indicator for a product including a component, the system comprising: a calculating module configured to calculate the sustainability indicator for the product based on membership of the component in at least one list in a regulatory category.

A third aspect of the invention provides a method for calculating a sustainability indicator for a product including one or more components, the method comprising: defining a plurality of regulatory categories, selecting at least one regulatory list to be a member of each regulatory category, assigning a weighting factor to each regulatory category, sorting each regulatory category into a classification; calculating a sustainability indicator for the classification for the product, wherein the calculating includes: performing a calculation of an interim sustainability indicator including: determining a percentage of a component in the product, determining whether the component in the product is a member of any regulatory list in a regulatory category in the classification, in response to the component being a member of any regulatory list in the regulatory category in the classification, multiplying the percentage of the component in the product and the weighting factor for the regulatory category in the classification, repeating the calculation of the interim sustainability indicator for each regulatory category in the classification; combining the interim sustainability indicators for each regulatory category to determine a total sustainability indicator for the component for the classification; repeating the calculation of an interim sustainability indicator for each component in the product to determine a total sustainability indicator for each component for the classification; and combining the total sustainability indicators for each component to determine a total sustainability indicator for the classification for the product.

A fourth aspect of the invention provides a method for calculating a sustainability indicator for a product including a component, the method comprising: calculating the sustainability indicator for the product based on membership of the component in at least one list in a regulatory category.

A fifth aspect of the invention provides a computer program comprising program code embodied in at least one computer-readable medium, which when executed, enables a computer system to implement a method for calculating a sustainability indicator for a product.

A sixth aspect of the invention provides a method of generating a computer system for calculating a sustainability indicator for a product including at least one component, the method comprising: providing a computer system operable to: calculate a sustainability indicator for a product.

A seventh aspect of the invention provides a method comprising: at least one of providing or receiving a copy of a computer program that is encoded in a set of data signals, wherein the computer program enables a computer system to implement a method for calculating a sustainability indicator for a product Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 2-4 show illustrative screenshots of examples of customization of embodiments of the invention.

FIG. 6 shows a chart illustrating a sample product's chemical formulation.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Embodiments of the invention disclosed herein calculate an indicator of a product's sustainability (i.e., green-ness) based on an algorithm, discussed in more detail below, that considers membership of a component(s) of the product in regulatory lists in regulatory categories, the percentage of the component in the product and a weighting factor for the regulatory categories.

Figure 1A:
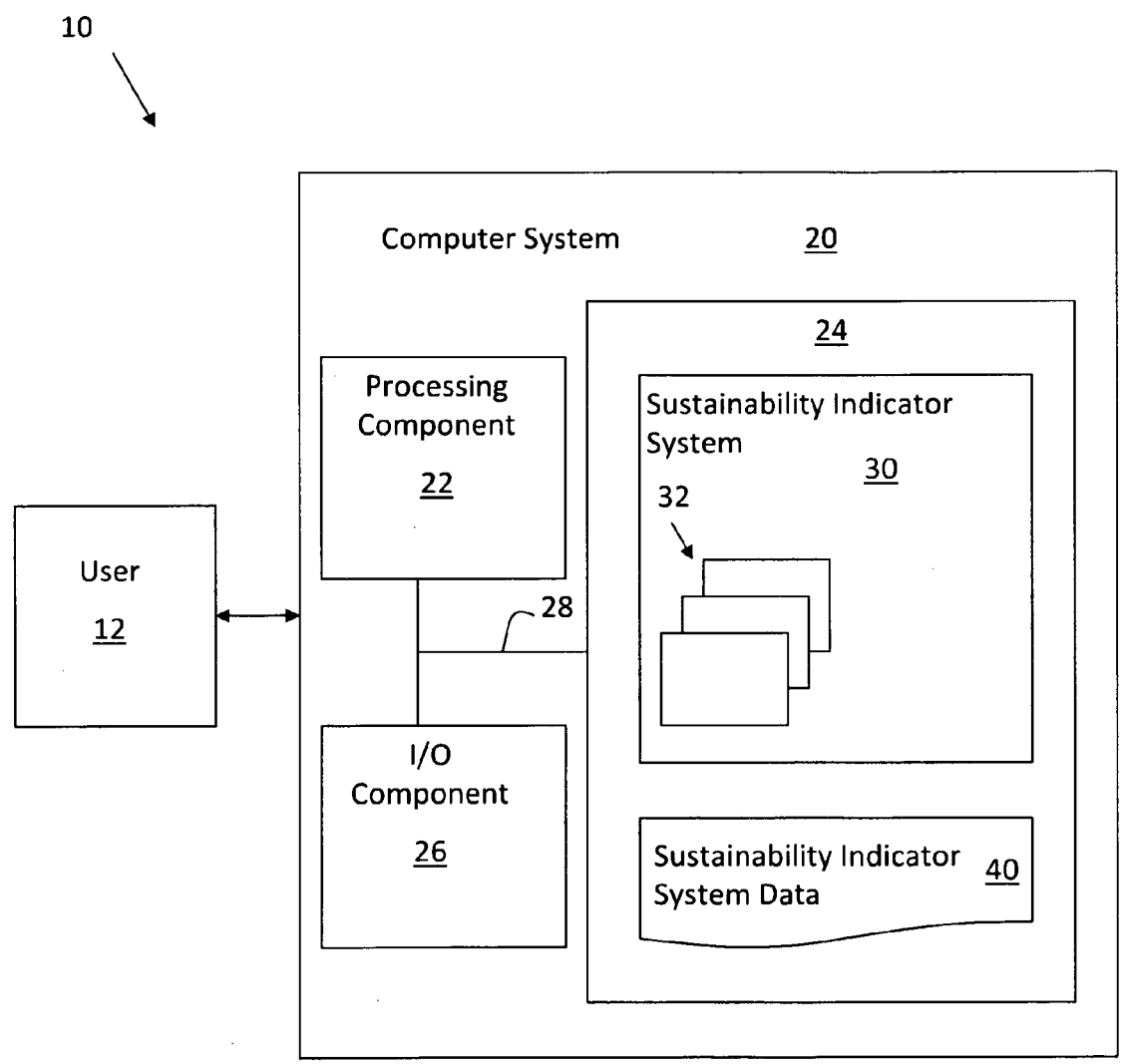
FIGS. 1A and 1B show an illustrative computer environment for implementing embodiments of the invention.
Figure 1B:
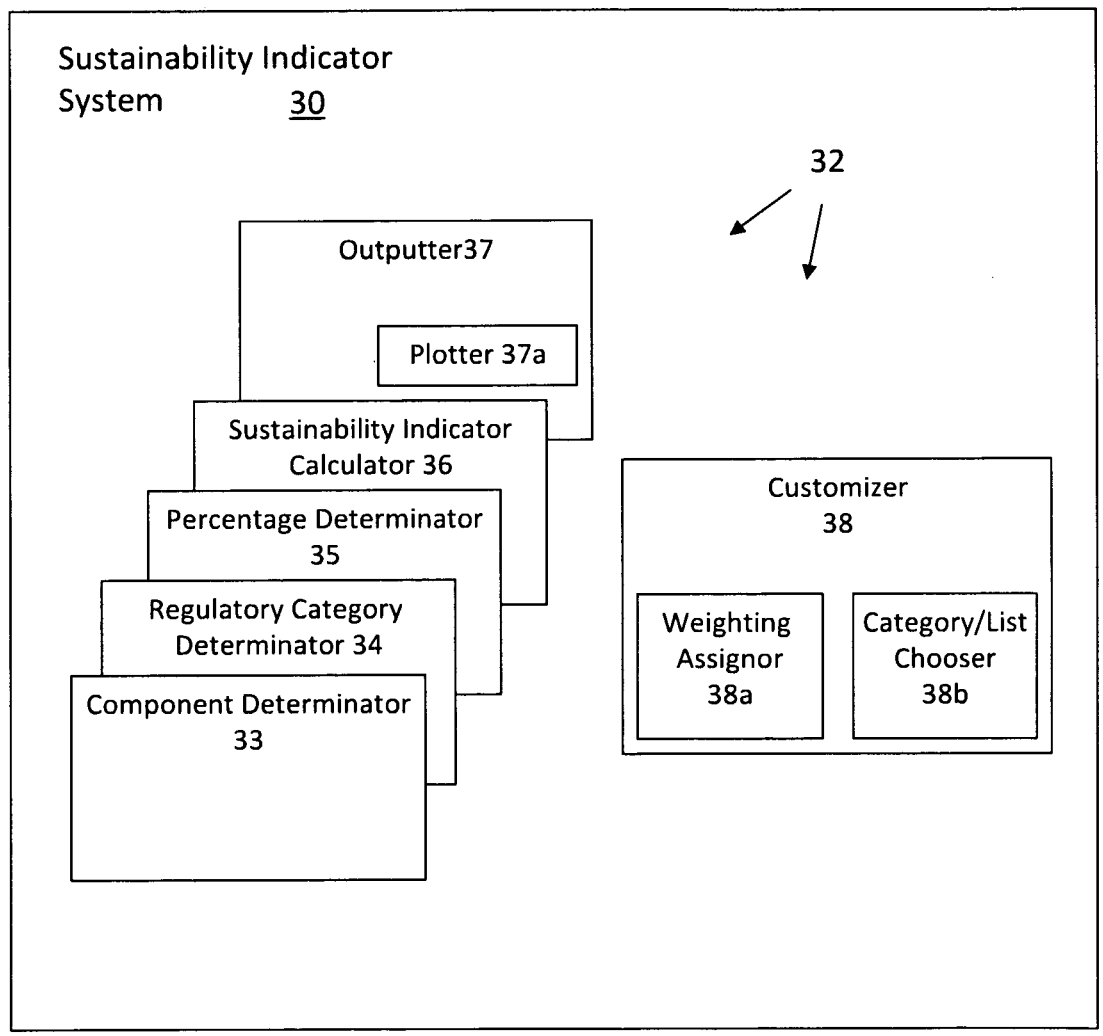

Turning to FIGS. 1A and 1B, an illustrative environment 10 for a calculating a sustainability indicator (SI) according to an embodiment is shown. To this extent, environment 10 includes a computer system 20 that can perform a process described herein in order to calculate a sustainability of a product. In particular, computer system 20 is shown including a sustainability indicator system 30, which makes computer system 20 operable to calculate a sustainability indicator by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as sustainability indicator system 30, which is at least partially fixed in a storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, sustainability indicator system 30 can manage a set of interfaces (e.g., graphical user interface(s), application program interface, and/or the like) that enable human and/or system users 12 to interact with sustainability indicator system 30. Further, sustainability indicator system 30 can manage (e.g., store, retrieve, create, manipulate, organize, present, etc.) the data, such as sustainability indicator system data 40, using any solution.

In any event, computer system 20 can comprise one or more general purpose computing articles of manufacture (e.g., computing devices) converted to a specific purpose computer article by inclusion of and executing of program code, such as sustainability indicator system 30, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, sustainability indicator system 30 can be embodied as any combination of system software and/or application software.

Further, sustainability indicator system 30 can be implemented using a set of modules 32, shown in more detail in FIG. 1B. In this case, a module 32 can enable computer system 20 to perform a set of tasks used by sustainability indicator system 30, and can be separately developed and/or implemented apart from other portions of sustainability indicator system 30. As used herein, the term "module" means any configuration of hardware, with or without software, which implements the functionality described in conjunction therewith using any solution, while the term "sub-module" means program code that enables a computer system 20 to implement the functionality described in conjunction therewith using any solution. When fixed in a storage component 24 of a computer system 20 that includes a processing component 22, a sub-module is part of a module. Regardless, it is understood that two or more modules, sub-modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of sustainability indicator system 30 fixed thereon (e.g., one or more modules 32). However, it is understood that computer system 20 and sustainability indicator system 30 are only representative of various possible equivalent computer systems that may perform a process described herein. To this extent, in other embodiments, the functionality provided by computer system 20 and sustainability indicator system 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

In any event, computer system 20 can obtain sustainability indicator system data 40 using any solution. For example, computer system 20 can generate and/or be used to generate sustainability indicator system data 40, retrieve sustainability indicator system data 40 from one or more data stores, receive sustainability indicator system data 40 from another system, and/or the like. Sustainability indicator system data 40 can include information on product components, information on percentages of components in products, regulatory lists categorizing components as discussed herein, and any other data or information discussed herein.

As discussed above, sustainability indicator system 30 can include one or more modules 32. Such modules can include a component determinator 33 which determines what components are in a product, a regulatory category determinator 34 which determines whether a component is listed on a list in a regulatory category, a percentage determinator 35 which determines the percentage of a component in a total product, a sustainability indicator calculator 36 which calculates a sustainability indicator as discussed herein, an outputter 37 which outputs a sustainability indicator for a product (including a plotter 37a which can plot one or more sustainability indicators on a graph), and/or a customizer 38 which customizes the system of the present disclosure, including by utilizing a weighting assignor 38a (which assigns a weighting factor to a regulatory category) and a category/list chooser 38b (which chooses which lists and/or regulatory categories will be searched by regulatory category determinator 35, and sorts the regulatory categories into classifications as desired).

Figure 2:
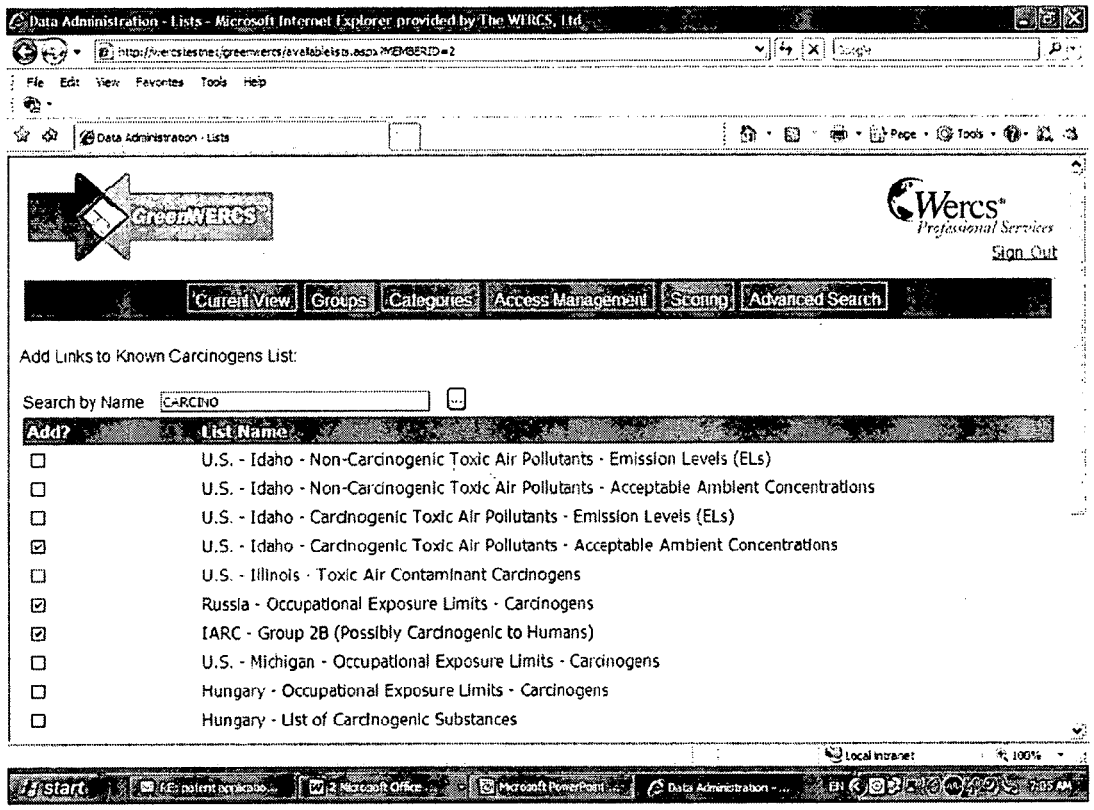

Turning to FIGS. 2-5, an example is provided to illustrate the calculation of the sustainability indicator (SI) according to embodiments of the present invention. In this example, a sustainability indicator is calculated for a product FIGS. 2-4 illustrate how customizer 38 configures the system to a user's requirements. This customization can include category/list chooser 38b presenting the user with regulatory lists and the user choosing which regulatory lists are of interest to the user, as discussed herein.

The regulatory lists can include lists of components sorted, i.e., characterized, by various hazards and/or properties of the components. "Component" as used herein, is intended to include elements, chemicals, families of chemicals, combinations of chemicals or other substances that are listed on regulatory lists. For example, a component is typically a chemical or substance which has a molecular weight, i.e., an identifiable molecular structure.

The lists can be prepared by any organization that prepares such lists, including, for example, government agencies (e.g., U.S. government agencies such as the Environmental Protection Agency (EPA) or Food and Drug Administration (FDA)), international agencies (e.g., International Agency for Research on Cancer (IARC)), private organizations, non-profit organizations, international agencies and organizations (e.g., the United Nations), international treaties and national and international standard setting agencies. Examples of such lists include, but are not limited, to those shown in FIGS. 2-4, such as: "U.S.—Illinois—Toxic Air Contaminants Carcinogens," "EU—Dangerous Substances Directive (67/548/EEC)—Annex 1—Reproductive Category 2," "EU—Endocrine Disrupters (COM (2001)262)—List of Evaluated Substances and their Exposure Concern," "IARC—Group 2A (Probably Carcinogenic to Humans)," and "Japan—ISHL Mutagens—Existing Chemicals."

As shown in FIG. 2, category/list chooser 38b can also allow a user to group the selected regulatory lists into regulatory categories created by the user, and then group the regulatory categories into classifications, as desired. In other words, once a user chooses which regulatory lists they are interested in, they can group the regulatory lists into regulatory categories of their choosing, and then can group the categories by classification as desired. In the example shown in FIG. 2, a user has checked the following lists: "U.S.—Idaho—Carcinogenic Toxic Air Pollutants—Acceptable Ambient Concentrations," "Russia—Occupational Exposure Limits—Carcinogens," and "IARC—Group 2B (Possibly Carcinogenic to Humans)" to be included in the category created by the user titled "Known Carcinogens."

The user can also define the classification as desired, such as a health related classification, an environmental related classification, a physical hazard related classification, etc. These classifications can also be pre-set by the system. Accordingly, the user can determine which classifications to calculate, which regulatory categories comprise a classification and which lists comprise a category. An example of this customization by a user is illustrated in FIGS. 3A-3M, where the user has created several regulatory categories (Known Carcinogens (FIG. 3A), Reproductive Hazards (FIG. 3B), Target Grey List (FIG. 3C), Endocrine Disruptors (FIG. 3D), Suspected Carcinogens (FIG. 3E), Mutagenic Hazards (FIG. 3F), Sensitizer (FIG. 3G), Ozone Depletion (FIG. 3H), Hazardous Waste (FIG. 3I), VOC (FIG. 3J), PBT chemicals (FIG. 3K), Air Pollutants (FIG. 3L), and Water Pollutants (FIG. 3M)) and chosen certain lists to be included in each of those categories.

In addition to using category/list chooser 38b to choose which lists and/or categories are of interest, weight assignor 38a can also be used to assign a weighting factor to the selected categories, as shown in the example in FIG. 4. The weighting factor may be an arbitrary number, assigned by a user or the system, based on what categories are most important to the user. In one embodiment, the higher the weighting factor, the more important that regulatory category is to the user or system. In the example shown in FIGS. 2-4, the user has chosen regulatory lists, defined the regulatory categories and assigned each regulatory category a weighting factor. For example, as shown in FIG. 4, the user has assigned a weighting factor of 500 to the Known Carcinogen category while assigning the Ozone Depletion category a weighting factor of 75. In another embodiment, the choosing of lists and/or regulatory categories, and the assigning of the weighting factor is automatically assigned by the system based on industry standards. For example, if it is generally accepted in the industry that "Known Carcinogens" are more relevant to a sustainability indicator analysis than "Suspected Carcinogens," the "Known Carcinogens" category could be assigned a higher weighting factor than "Suspected Carcinogens."

After the regulatory lists and regulatory categories have been set, the regulatory categories can also be grouped into classifications. In this example, as shown in FIGS. 2-4, the user has chosen to group some regulatory categories into a health related classification and some regulatory categories into an environmental related classification, e.g., the regulatory category "Known Carcinogens" has been grouped into the "health related classification" while the regulatory category "Ozone Depletion" has been grouped into the "environmental related classification." Once the system has been customized as discussed herein, the system can then calculate the sustainability indicator for a product, or several products, using the customized settings and the algorithm discussed herein. The system can also be configured to store a user's customized settings as a profile, and allow a user, or multiple users, to store a plurality of profiles for use with different types of products to be analyzed. For example, a user could set up a first profile for analyzing personal use products such as shampoos or deodorants, and a second profile for analyzing cleaning products, such as window cleaners or bathroom cleansers.

Figure 5:
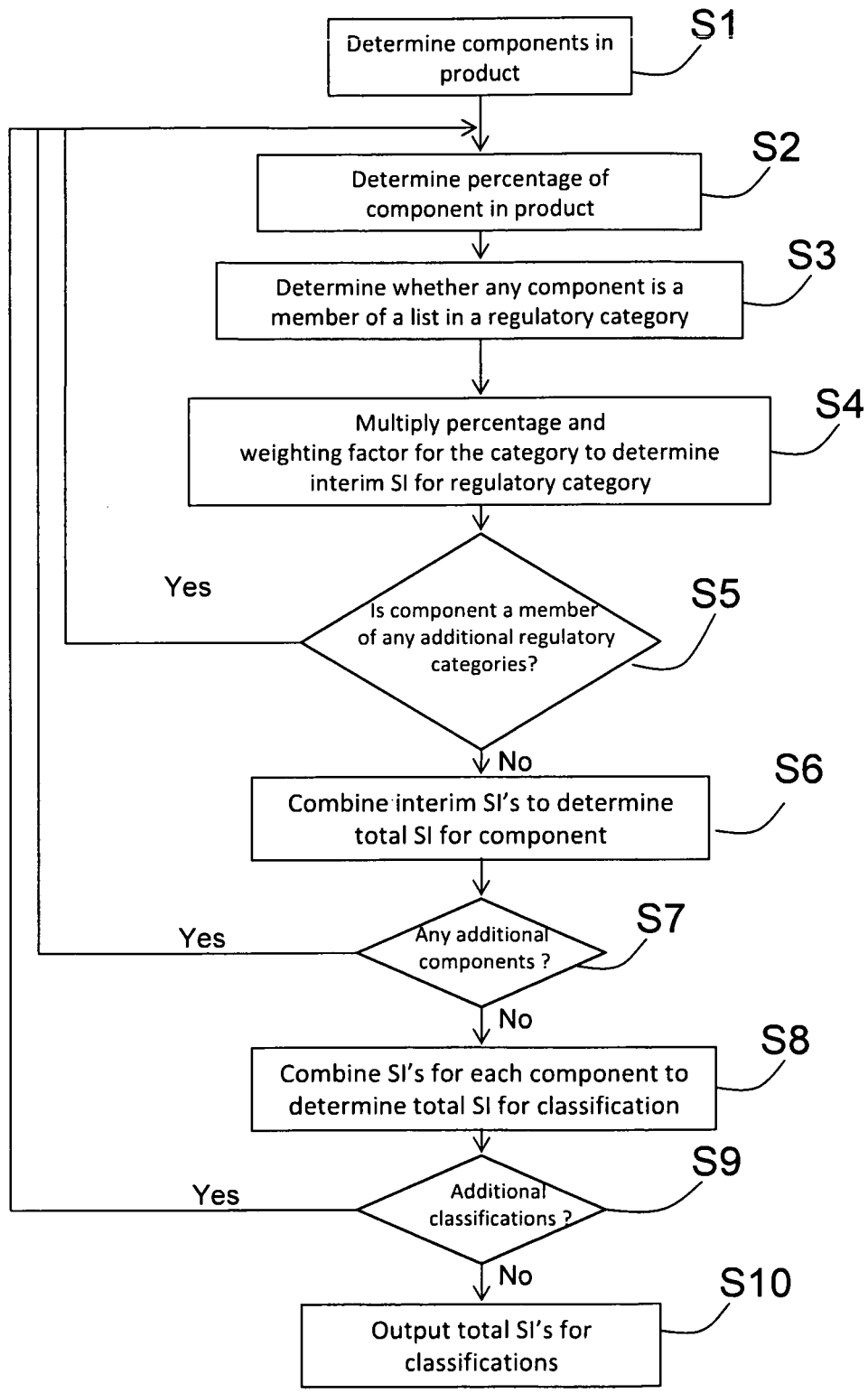
FIG. 5 shows a flowchart showing the steps involved in calculating a sustainability indicator according to embodiments of the invention.

Turning to FIG. 5, an illustrative flow chart showing calculation of a sustainability indicator (SI) for a product is shown. First, as shown in process S1, component determinator 33 determines what components are in the product, e.g., what chemicals make up a product's formulation. FIG. 6 shows an example product, and illustrates that the product contains several different chemicals, including Benzoquinone, Formaldehyde and Edta. Where the product is well known, component determinator 33 can access data 40, or any publicly or privately available databases to provide this information. Alternatively, the user can also provide information to component determinator 33 regarding the components in the product. For example, a user could manually input what components make up the product.

Next, as shown in process S2, percentage determinator 35 determines the percentage of a component in a product. In this example, percentage determinator 35 determines that formaldehyde is approximately 10% of the total product's formulation (as shown in FIG. 6). Where the product is well known, percentage determinator 35 can access data 40, or any publicly or privately available databases to provide this information. Alternatively, the user can provide information to percentage determinator 35 regarding the percentage of the components in the product. For example, a user could manually enter the percentages of each component in the product.

In process S3, regulatory category determinator 34 determines whether the component is a member of at least one list in a regulatory category which a user has preselected (or has been selected by the system). In this example, the user has pre-selected certain lists in a "Known Carcinogens" category using customizer 38 and category/list chooser 38a. Accordingly, regulatory category determinator 34 searches the lists in the "Known Carcinogens" category, to determine whether formaldehyde (the component being searched in this example) is listed on any of the lists in that category. For this example, it is assumed that formaldehyde is listed on such a list, e.g., "U.S.—California—Proposition 65—Carcinogens List" in the "Known Carcinogens" category. Every list in a regulatory category does not need to be searched, once a component is found to be a member of one list in a regulatory category, step S3 is complete. In other words, a component is only counted once regardless of how many regulatory lists it is a member of.

It is noted that processes S1 through S3 need not be performed in the order shown in FIG. 5. For example, percentage determinator 35 can determine a percentage of a component after determining whether the component is a member of a list in a category.

In step S4, sustainability indicator calculator 36 multiplies the percentage of the product, P, by the weighting factor, W, assigned to the regulatory category to determine an interim sustainability indicator. In the example discussed herein, the percentage, 10%, would be multiplied by the weighting factor for the Known Carcinogen category, which was '500' in this example (FIG. 4). Therefore, the result of the multiplication, the interim sustainability indicator, would be 50.

As shown in process S5, the system next determines whether the component, (formaldehyde, in this example) is a member of any additional regulatory categories in the chosen classification. If yes, processes S2-S4 are repeated for the component (formaldehyde, in this example) for every selected category in the chosen classification. Once all selected categories have been searched and it is determined that the component is not a member of any additional regulatory categories (i.e., a "no" at process S5), the interim sustainability indicators from processes S2-S4 are combined together to determine a total SI for the component, as shown in process S6. Using the example discussed herein, the lists in the other selected categories under the health related classification are searched to determine whether formaldehyde is listed in any lists in those regulatory categories. For example, if formaldehyde is also listed on a list in a "Mutagenic Hazard" category, the percentage of formaldehyde (e.g., 10%) would be multiplied by a weighting factor assigned to the "Mutagenic Hazard" category (e.g., 50), to yield a result of 5.0. If it is assumed for purposes of this example that formaldehyde is not listed in a list in any other selected regulatory category, the total sustainability indicator for the formaldehyde component would then be 55 (added). The sustainability indicators may be combined in any now known or later developed manner of combining. In one embodiment, they may be added together. In another embodiment, they may be averaged.

After a total SI for the component is determined in process S6, the system may determine whether there are any additional components in the product, in process S7. If yes, the entire process (processes S2-S6) is repeated for every component in the product to calculate a total sustainability indicator for each component. Once it is determined that there are no additional components in the product (i.e., a "no" at process S7), the total sustainability indicators for each component are combined together in process S8 to determine a total sustainability indicator for the classification. Again, the sustainability indicators may be combined in any now known or later developed manner of combining. In one embodiment, they may be added together. In another embodiment, they may be averaged.

As shown in process S9, once a total sustainability indicator for a classification has been calculated, the system may next determines whether there are any additional classifications that have been created. If yes, the entire process (processes S1-S9) is repeated for any other selected classification. For example, after searching all of the categories in the health related classification as discussed above, regulatory category determinator 34 will search the regulatory categories sorted into an environmental related classification to determine whether formaldehyde is listed on any of the selected lists within those regulatory categories. If yes, then sustainability indicator calculator 36 will multiply the percentage, P, of the component (i.e., 10%) with the weighting factor for the corresponding category (e.g., 100 if formaldehyde was listed on a list in the "PBT Chemicals" category, as shown in FIGS. 3K and 4). Again, as with the example discussed above, this calculation is repeated for each regulatory category of which the component is a member of a list therein, and is repeated for each component, to determine a total sustainability indicator for each classification.

Figure 7:
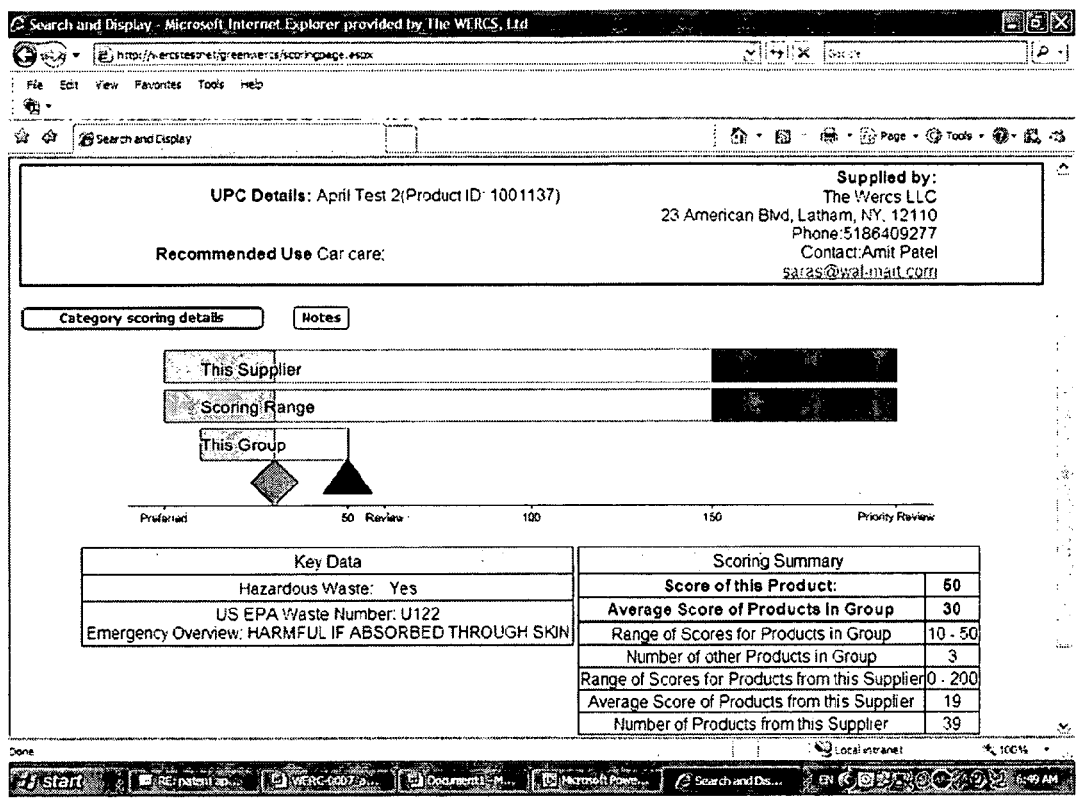
FIGS. 7 and 8 show sample outputs of how a sustainability indicator for a product can be plotted compared to other products.
Figure 8:
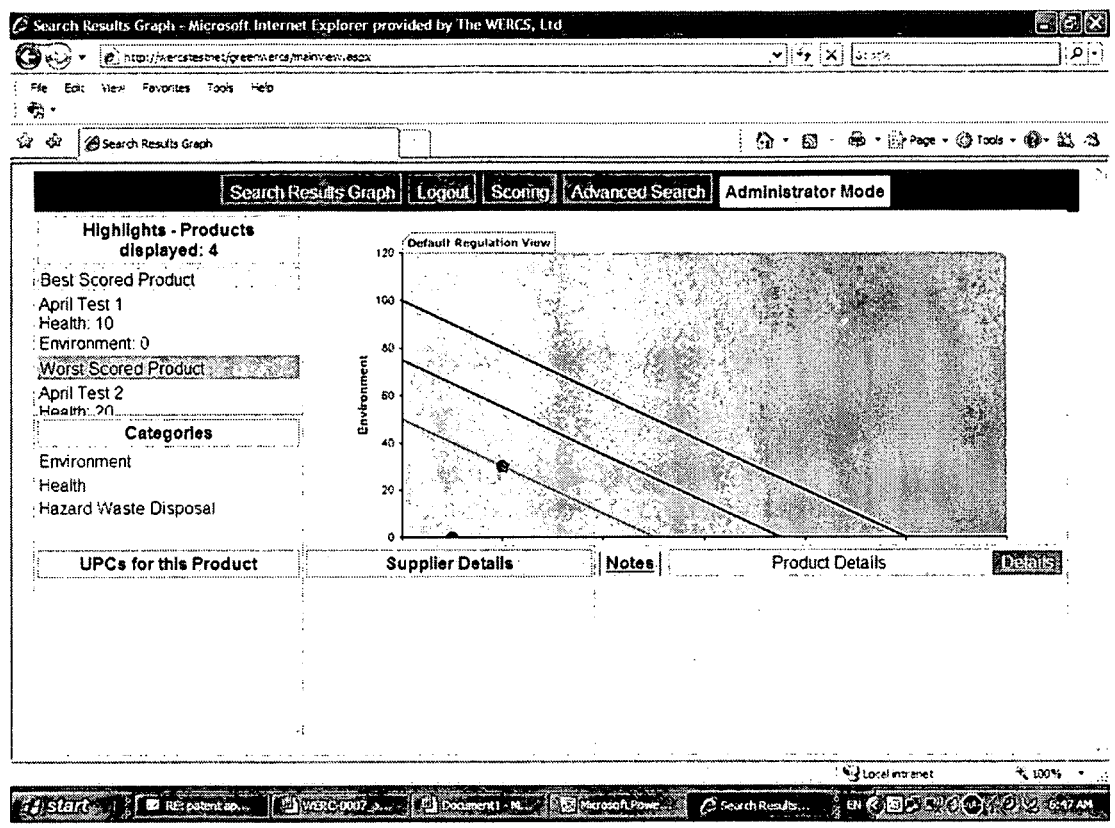

Once the total sustainability indicators for every classification have been calculated and it has been determined that there are no other classifications, (i.e., a "no" at process S9), outputter 37 outputs the total sustainability indicators for every classification with the product, as shown in process S10. The sustainability indicator(s) may be outputted for use with a product in a number of ways, for example, stored in a database, displayed on a product, or any other manner of indicating to a consumer (e.g., a merchandiser, a supplier, an end user of the product, etc.) information about a product. For example, as shown in FIG. 7, the sustainability indicators can be provided as numeric indicators. In one embodiment, if the sustainability indicator(s) is a numeric indicator, the number can be displayed on a product for a consumer to view. In another embodiment, the sustainability indicators calculated as discussed herein, typically in the form of numeric indicators, can be plotted on a graph using plotter 37a to provide a graphical representation of the product's sustainability. Such graphical representation could include two or three dimensional plots, bar graphs, or other known graphical representations. For example, as shown in FIG. 8, after calculating $SI_H$, the total SI for the health related classification, and $SI_E$, the total SI for the environmental related classification, as discussed herein, plotter 32i can plot $SI_H$ and $SI_E$ on opposing axes on a graph to show the relationship between the sustainability indicators for each of the classifications.

In another embodiment, a grading system can be used to grade a sustainability indicator (for example, as "high/medium/low", on a scale from 1 to 10, or using traditional educational grades A through F). This grade can be displayed on a product in order for a consumer or retailer to view. The sustainability indicators can also be used to compare similar products, such as dishwashing detergents or lawn fertilizers to see which brand is more "green" as shown in FIG. 7. In another embodiment, the sustainability indicator(s) can be associated with a product in a database.

In addition, while it is discussed herein that the total sustainability indicator for each classification is outputted, it is understood that the results of other calculations, and any raw data obtained throughout the disclosed system's processes (e.g., processes S4, S6, S8) may be outputted. For example, any of the following may be outputted: the sustainability indicator for each classification, the total sustainability indicator for any component, the interim sustainability indicators, and/or the results of the calculations in process S4 for each component or category.

The calculations discussed herein can also be expressed in the algorithm discussed below:

$$SI_H = \sum_{i=1}^{i=N} \sum_{k=1}^{k=T} P_{Ci} * W_{HRk} * M(C_i, HR_k)$$

$$SI_E = \sum_{i=1}^{i=N} \sum_{k=1}^{k=T} P_{Ci} * W_{ERk} * M(C_i, ER_k)$$

where:
C=A component in the formulation of a product.
P=Percentage of an $i^{th}$ component in a product's formulation;
HR=$k^{th}$ category in a health related classification;
ER=$k^{th}$ category in an environmental related classification;
W=Weighting factor for a regulatory category;
N=Total number of components in a given formulation;
$SI_H$=Sustainability indicator for health related classification;
$SI_E$=Sustainability indicator for environmental related classification;
T=Total number of regulatory categories defined; and
M=the Membership function for the regulatory category. It returns a "1" if a component is listed on any regulatory list that belongs to a regulatory category. It returns a "0" if a component is not listed on any regulatory list that belongs to a regulatory category.

As the algorithm shows, sustainability indicator calculator 36 multiplies the percentage of a component in a product, P, by the weighting factor for the regulatory category, W. The two summations illustrate that the process is repeated for every component of the product, and for every regulatory category in the selected classification. As noted above, if the component is a member of any list in a selected regulatory category, the membership function, M, returns a 1, but if the component is not a member of any list in the selected regulatory category, the membership function, M, returns a 0.

While shown and described herein as a method and system for providing a sustainability indicator, it is understood that aspects of the invention further provide various alternative embodiments. For example, in one embodiment, the invention provides a computer program fixed in at least one computer-readable medium, which when executed, enables a computer system to provide a sustainability indicator. To this extent, the computer-readable medium includes program code, such as sustainability indicator system 30 (FIGS. 1A and 1B), which implements some or all of a process described herein. It is understood that the term "computer-readable medium" comprises one or more of any type of tangible physical storage medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as sustainability indicator system 30 (FIGS. 1A and 1B) which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for providing a sustainability indicator. In this case, a computer system, such as computer system 20 (FIGS. 1A and 1B), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to provide a sustainability indicator system as described herein. In this case, the service provider can manage (e.g., create, maintain, support, etc.) a computer system, such as computer system 20 (FIGS. 1A and 1B), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer system for calculating a total sustainability indicator for a classification for a product including one or more components, the system comprising:
   a customization module configured to allow a user to:
      define a plurality of regulatory categories,
      select at least one regulatory list to be a member of each regulatory category,
      assign a weighting factor to each regulatory category, and
      sort each regulatory category into a classification; and
   a calculating module configured to calculate, using at least one computing device, the sustainability indicator for the classification, wherein the calculating module:
      performs a calculation of an interim sustainability indicator including:
         determining a percentage of a component in the product,
         determining whether the component in the product is a member of any regulatory list in a regulatory category in the classification,
         in response to the component being a member of any regulatory list in the regulatory category in the classification, multiplying the percentage of the component in the product and the weighting factor for the regulatory category in the classification,
         repeating the calculation of an interim sustainability indicator for each regulatory category in the classification, and
         combining the interim sustainability indicators for each regulatory category to determine a total sustainability indicator for the component for the classification;
      repeats the calculation of an interim sustainability indicator for each component in the product to determine a total sustainability indicator for each component for the classification; and
      combines the total sustainability indicators for each component to determine a total sustainability indicator for the classification for the product.

2. The computer system of claim 1, wherein the calculating module further calculates a total sustainability indicator for a plurality of classifications for the product.

3. The computer system of claim 2, further comprising an outputting module configured to output one or more of the following: the total sustainability indicator for each classification for the product, the interim sustainability indicator for each regulatory category, and the total sustainability indicator for any component.

4. The computer system of claim 1, wherein the total sustainability indicator for the classification is a numerical indicator or an alpha-numeric grade.

5. A computer system for calculating a sustainability indicator for a product including a component, the system comprising:
   a calculating module configured to calculate, using at least one computing device, the sustainability indicator for the product based on membership of the component in at least one list in a regulatory category.

6. The computer system of claim 5, further comprising: a customization module configured to allow a user to:
   define a plurality of regulatory categories,
   select at least one regulatory list to be a member of each regulatory category,
   assign a weighting factor to each regulatory category, and
   sort each regulatory category into a classification.

7. The computer system of claim 5, wherein the calculating module further:
   performs a calculation of an interim sustainability indicator including:
      determining a percentage of a component in the product,
      determining whether the component in the product is a member of any regulatory list in a regulatory category in a classification,
      in response to the component being a member of any regulatory list in the regulatory category in the classification, multiplying the percentage of the component in the product and a weighting factor for the regulatory category in the classification,
      repeating the calculation of an interim sustainability indicator for each regulatory category in the classification; and
      combining the interim sustainability indicators for each regulatory category to determine a total sustainability indicator for the component for the classification;
   repeats the calculation of an interim sustainability indicator for each component in the product to determine a total sustainability indicator for each component for the classification; and
   combines the total sustainability indicators for each component to determine a total sustainability indicator for the classification for the product.

8. The computer system of claim 7, wherein the calculating module further calculates a total sustainability indicator for a plurality of classifications for the product.

9. The computer system of claim 8, further comprising an outputting module configured to output one or more of the following: the total sustainability indicator for each classification for the product, the interim sustainability indicator for each regulatory category, and the total sustainability indicator for any component.

10. The computer system of claim 5, wherein the total sustainability indicator for the classification is a numerical indicator or an alpha-numeric grade.

11. The computer system of claim 7, further comprising calculating a total sustainability indicator for the classification for a plurality of products.

12. The computer system of claim 5, wherein the calculating module uses the following algorithm:

$$SI_H = \sum_{i=1}^{i=N} \sum_{k=1}^{k=T} P_{Ci} * W_{HRk} * M(C_i, HR_k)$$

$$SI_E = \sum_{i=1}^{i=N} \sum_{k=1}^{k=T} P_{Ci} * W_{ERk} * M(C_i, ER_k)$$

where:
   C=a selected component of the product;
   P=a percentage of an $i^{th}$ component in the product;
   HR=$k^{th}$ category in a health related classification;
   ER=$k^{th}$ category in an environmental related classification;
   W=a weighting factor for the regulatory category;
   N=a total number of components in the product;

SI$_H$=a sustainability indicator for the health related classification;
SI$_E$=a sustainability indicator for the environmental related classification;
T=a total number of regulatory categories; and
M=a membership function for the at least one regulatory category, wherein M returns a "1" in response to the selected component being listed on any regulatory list that belongs to a regulatory category, and M returns a "0" in response to the selected component not being listed on any regulatory list that belongs to a regulatory category.

13. A method for calculating a sustainability indicator for a product including one or more components, the method comprising:
defining a plurality of regulatory categories,
selecting at least one regulatory list to be a member of each regulatory category,
assigning a weighting factor to each regulatory category,
sorting each regulatory category into a classification;
using at least one computing device to calculate a sustainability indicator for the classification for the product, wherein the calculating includes:
performing a calculation of an interim sustainability indicator including:
determining a percentage of a component in the product,
determining whether the component in the product is a member of any regulatory list in a regulatory category in the classification,
in response to the component being a member of any regulatory list in the regulatory category in the classification, multiplying the percentage of the component in the product and the weighting factor for the regulatory category in the classification,
repeating the calculation of the interim sustainability indicator for each regulatory category in the classification;
combining the interim sustainability indicators for each regulatory category to determine a total sustainability indicator for the component for the classification;
repeating the calculation of an interim sustainability indicator for each component in the product to determine a total sustainability indicator for each component for the classification; and
combining the total sustainability indicators for each component to determine a total sustainability indicator for the classification for the product.

14. The method of claim 13, wherein the calculating also includes calculating a total sustainability indicator for a plurality of classifications for the product.

15. The method of claim 14, further comprising outputting one or more of the following: the total sustainability indicator for each classification for the product, the interim sustainability indicator for each regulatory category, and the total sustainability indicator for any component.

16. The method of claim 13, wherein the total sustainability indicator for the classification is a numerical indicator or an alpha-numeric grade.

17. A method for calculating a sustainability indicator for a product including a component, the method comprising:
calculating the sustainability indicator for the product based on membership of the component in at least one list in a regulatory category.

18. The method of claim 17, further comprising:
defining a plurality of regulatory categories,
selecting at least one regulatory list to be a member of each regulatory category,
assigning a weighting factor to each regulatory category, and
sorting each regulatory category into a classification.

19. The method of claim 17, the calculating further comprising:
performing a calculation of an interim sustainability indicator including:
determining a percentage of a component in the product,
determining whether the component in the product is a member of any regulatory list in a regulatory category in a classification,
in response to the component being a member of any regulatory list in the regulatory category in the classification, multiplying the percentage of the component in the product and a weighting factor for the regulatory category in the classification,
repeating the calculation of an interim sustainability indicator for each regulatory category in the classification; and
combining the interim sustainability indicators for each regulatory category to determine a total sustainability indicator for the component for the classification;
repeating the calculation of an interim sustainability indicator for each component in the product to determine a total sustainability indicator for each component for the classification; and
combining the total sustainability indicators for each component to determine a total sustainability indicator for the classification for the product.

20. The method of claim 19, wherein the calculating further comprises calculating a total sustainability indicator for a plurality of classifications for the product.

21. The method of claim 20, further comprising outputting one or more of the following: the total sustainability indicator for each classification for the product, the interim sustainability indicator for each regulatory category, and the total sustainability indicator for any component.

22. The method of claim 19, wherein the total sustainability indicator for the classification is a numerical indicator or an alpha-numeric grade.

23. The method of claim 19, further comprising calculating a total sustainability indicator for the classification for a plurality of products.

24. The method of claim 17, wherein the calculating uses the following algorithm:

$$SI_H = \sum_{i=1}^{i=N} \sum_{k=1}^{k=T} P_{Ci} * W_{HRk} * M(C_i, HR_k)$$

$$SI_E = \sum_{i=1}^{i=N} \sum_{k=1}^{k=T} P_{Ci} * W_{ERk} * M(C_i, ER_k)$$

where:
C=a selected component of the product;
P=a percentage of an $i^{th}$ component in the product;
HR=a $k^{th}$ category in a health related classification;
ER=a $k^{th}$ category in an environmental related classification;
W=a weighting factor for the regulatory category;
N=a total number of components in the product;
SI$_H$=a sustainability indicator for the health related classification;

$SI_E$=a sustainability indicator for the environmental related classification;

T=a total number of regulatory categories; and

M=a membership function for the at least one regulatory category, wherein M returns a "1" in response to the selected component being listed on any regulatory list that belongs to a regulatory category, and M returns a "0" in response to the selected component not being listed on any regulatory list that belongs to a regulatory category.

25. A computer program comprising program code embodied in at least one computer-readable medium, which when executed, enables a computer system to implement a method for calculating a sustainability indicator for a product including one or more components as set forth in claim 17.

26. A method of generating a computer system for calculating a sustainability indicator for a product including at least one component, the method comprising:
   providing a computer system operable to:
   calculate a sustainability indicator for a product including one or more components, as set forth in claim 17.

27. A method comprising at least one of providing or receiving a copy of a computer program that is encoded in a set of data signals, wherein the computer program enables a computer system to implement a method for calculating a sustainability indicator for a product including one or more components, as set forth in claim 17.

* * * * *